United States Patent
Frost et al.

[11] Patent Number: 5,453,339
[45] Date of Patent: Sep. 26, 1995

[54] METHOD FOR PRODUCING A NON-UNIFORM HOLOGRAPHIC ELEMENT ON A GLASS PANE

[75] Inventors: Thorsten Frost, Meerbusch; Manfred-Andreas Beeck, Gifhorn, both of Germany

[73] Assignee: Saint Gobain Vitrage International, Courbevoie, France

[21] Appl. No.: 140,361

[22] Filed: Oct. 20, 1993

Related U.S. Application Data

[63] Continuation of Ser. No. 857,214, Mar. 25, 1992, abandoned.

[30] Foreign Application Priority Data

Mar. 28, 1991 [DE] Germany .......................... 41 10 235.5

[51] Int. Cl.[6] .................................. G03H 1/18; G03H 1/04
[52] U.S. Cl. ...................................... 430/1; 430/2; 359/13; 359/14; 359/3
[58] Field of Search ............................... 430/1, 2; 359/1, 359/3, 9, 10, 28, 30

[56] References Cited

U.S. PATENT DOCUMENTS

| | | | |
|---|---|---|---|
| 3,728,118 | 4/1973 | Fillmore et al. | 430/1 |
| 4,111,519 | 9/1978 | Gillis et al. | 359/9 |
| 4,613,200 | 9/1986 | Hartman | 350/3.7 |
| 4,714,309 | 12/1987 | Woodcock et al. | 359/34 |
| 4,799,746 | 1/1989 | Wreede | 359/3 |
| 4,816,360 | 3/1989 | Doyle et al. | 430/1 |
| 4,818,045 | 4/1989 | Chang | 359/13 |
| 4,826,290 | 5/1989 | Wreede et al. | 359/3 |
| 4,988,151 | 1/1991 | Moss | 359/30 |
| 4,988,151 | 1/1991 | Moss | 350/3.66 |
| 5,145,756 | 9/1992 | Windeln et al. | 359/28 |

FOREIGN PATENT DOCUMENTS

| | | |
|---|---|---|
| 216692 | 4/1987 | European Pat. Off. . |
| 0316207 | 5/1989 | European Pat. Off. . |
| 0377293 | 7/1990 | European Pat. Off. . |
| 3523032 | 2/1986 | Germany . |
| 8603853 | 7/1986 | WIPO ............ 359/10 |

*Primary Examiner*—Charles L. Bowers, Jr.
*Assistant Examiner*—Martin J. Angebranndt
*Attorney, Agent, or Firm*—Pennie & Edmonds

[57] ABSTRACT

In a windshield having a holographic element integrated in the windshield for example a reflection hologram for reflecting optical information into the visual range of the driver, the edge region (4) of the hologram is resolved like a web. The web decreases from a high area fraction in the zone adjoining the actual hologram to a low area fraction in the zone bordering the glass area.

3 Claims, 3 Drawing Sheets

METHOD FOR PRODUCING A NON-UNIFORM HOLOGRAPHIC ELEMENT ON A GLASS PANE

This is a continuation of application Ser. No. 07/857,214, filed Mar. 25, 1992, now abandoned.

The invention relates to a glass pane, in particular a motor vehicle windshield, having an integrated holographic element with area dimensions smaller than the glass pane. It relates, furthermore, to various methods for producing a holographic element for such a glass pane.

A windshield having an integrated holographic element is disclosed in European Patent EP 216692B. The holographic element can, for example, be a reflection hologram, through which optical information that is generated at a different location is directed into the field of view of the driver. The optical information can, however, also be stored in the holographic element itself, and rendered visible to the driver by illuminating the hologram using a wavelength tuned to the hologram. The holographic elements comprise a backing film and a layer containing the hologram. The elements have dimensions that are relatively small compared to the area of the windscreen and are arranged in the region of the windscreen which is located in the field of view of the driver.

It is known to integrate a holographic element having the nature of a concave mirror into a windscreen (German Patent 35 23 032 A1), or to arrange a holographic element having the image and the function of a brake light in or on the rear screen of a motor vehicle (U.S. Pat. No. 4,916,593).

In all known cases in which the holographic element is smaller in terms of area than the glass pane, the holographic layer is terminated at least partially along a straight or curved line inside the area of the glass pane.

U.S. Pat. No. 4,988,151 discloses a method to reduce the visible line of demarcation between the projection area of the holographic display and the surrounding area. In accordance with that method, a frame of holographic material is masked to define a multiplicity of photosensitive and photodesensitized pixel areas. The holographic material is then holographically exposed to form a hologram only on the photosensitive pixel areas. In this method, either the number and/or density of the photodesensitized pixel areas are varied so that the proportion of desensitized pixel areas increases with proximity to the edge of the frame or the density of the pixel areas is kept constant, and the size of the desensitized area of each pixel is increased with proximity to the edge of the hologram frame.

In the known methods the transition at the edge of the holographic element is discontinuous.

No matter what the formation and function of the hologram, holographic elements always have slightly different transmission and reflection characteristics than the regions of the glass pane adjoining the holographic elements and in which they are integrated. The reason for this is that the holographic elements are designed for largely monochromatic light. Consequently, monochromatic light is perceived in the reflection, depending on the angle of incidence, while the transmission of the holographic element reproduces the associated complementary color sensation. These color sensations of the holographic element, which stand out against the vehicle glass pane both in the reflection and the transmission, can be perceived as disturbing.

It is the object of the invention further to develop a glass pane having an integrated holographic element to the effect that the holographic element has a less striking effect and blends harmoniously into the surrounding glass pane.

The essence of the invention is that in its regions bordering the visual range of a glass pane, the holographic element has a transition zone in which the reflection and transmission characteristics approximate the reflection characteristics of the glass pane in a continuous fashion.

The invention is based on the knowledge that the area of the glass pane occupied by the hologram is particularly striking because the transition of the reflection characteristics at the boundaries of the hologram occurs abruptly along a sharp line, and thus represents a contrast jump. Such a contrast jump affects the human eye like an edge on which the eye is fixed. According to the invention, the sharp dividing line is replaced by a more or less wide transition region. This transition region having reflection and transmission characteristics which are located between the reflection and transmission characteristics of the part of the glass pane provided with the hologram and the remainder of the glass pane substantially improves the optical impression of the hologram overall.

According to the invention, the transition zone is provided with a continuous holographic layer whose transition and reflection characteristics change by virtue of a hologram structure which changes inside the transition zone. For example, the reflection characteristics can change in such a way that with increasing approach to the bordering visual range of the glass pane, the color tone shifts in such a way that it has a less sensitive effect on the eye. It is also possible to produce holograms having a continuously changing reflectivity in the edge region in conjunction with a constant reflection wavelength, to be precise by undertaking an additional illumination of the holographic layer by means of incoherent UV light, but in the edge region by means of an exposure energy opposing the exposure energy of the laser light, in such a way that the sum of the exposure energies is constant at each location of the hologram, and as a result a hardening of the gelatine layer that is constant over the entire hologram is achieved.

It is also possible in developing the invention to provide a web-like structure of the hologram in the transmission zone and, in addition, to vary the reflection and transmission characteristics of the holographic sub-areas.

A windshield according to the invention and a method for producing corresponding holographic elements are described in more detail below with reference to the drawings, wherein.

Figure 1:
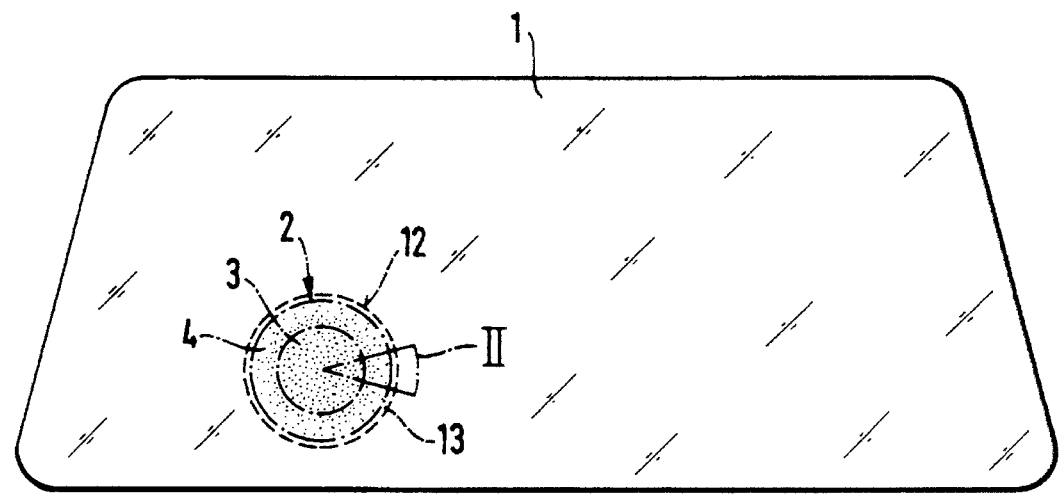
FIG. 1 is an overall plan view of a windshield according to the invention.

The windshield 1 represented in FIG. 1 consists of laminated glass, and the holographic element 2 is constructed as a circular surface in the form of an island surrounded on all sides by the viewing area of the glass pane. The element 2 is arranged between the two individual glass layers of the laminated glass pane. However, the holographic element can also have any other arbitrary shape and can also be arranged, for example, at the edge of the windscreen in the form of a "peninsula". In the case represented, it has the function of a color-selective semi-transparent mirror, also termed "combiner", for a head-up display, and is arranged directly in front of the driver in the field of view of the windshield. By comparison with the dimensions of the windshield, the holographic element 2 has relatively small real dimensions.

In the region 3, which undertakes the actual function of the color-selective semi-transparent mirror, the holographic element has a continuous holographic layer. The region 3 is surrounded in a known manner by a transition zone 4, inside which the holographic layer is provided with regular perforations whose area fraction increases from inside to outside.

Figure 2:
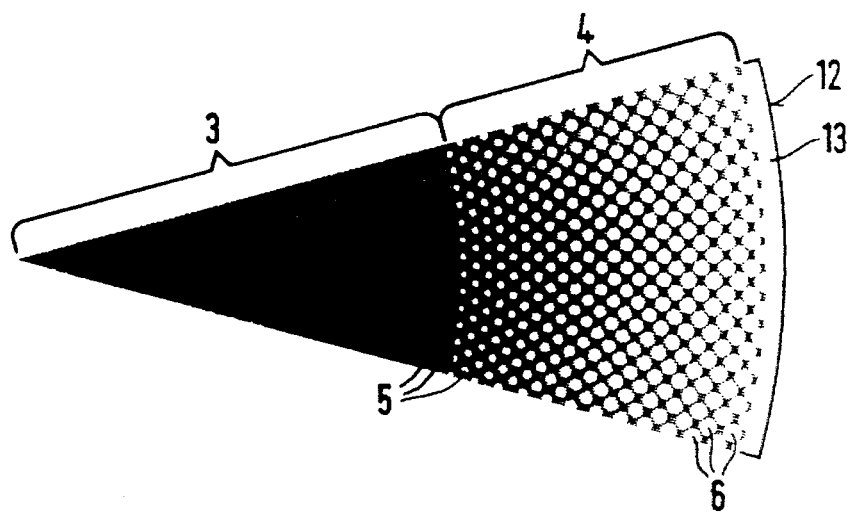
FIG. 2 is an enlarged detail of FIG. 1 taken at II.

As may be seen in detail in FIG. 2, the transition zone 4 consists of a point or perforation raster, with perforations 5, 6 of the holographic layer becoming larger from inside to outside. Whereas the area coverage of the holographic layer is approximately 90 to 95% at the level of the innermost perforations 5, at the end of the transition region 4, that is to say at the level of the perforations 6, it is only approximately 5 to 10%.

In the known technology, the holographic element 2 normally consists of a transparent backing film, for example a polyester film, and the holographic functional layer is arranged on the backing film. The backing film as such has essentially the same transmission and reflection characteristics as the laminated glass pane, and as such does not have a disturbing effect when it is embedded without a holographic functional layer in the laminated glass pane. The boundary 12 of the transparent backing film 13 of the holographic element is therefore not or scarcely to be perceived in the windshield.

In producing holographic elements having an edge resolved like a web, all that is important is therefore to resolve the holographic layer as such correspondingly towards the edge, whereas in the backing film itself such an edge resolution is not required. Although it is conceivable in a pure perforation mask to undertake the perforation or by punching out the backing film provided with the holographic layer, the manipulation and further processing of such holographic elements is bound up with difficulties because of the discontinuous backing film in the edge region.

Exemplary embodiments are described below for methods which enable the production of holograms according to the invention having web-like edge regions.

EXAMPLE 1

Known methods are used to produce a holographic element, having a homogenous reflection hologram by exposing to interfering laser radiation a gelatine layer which is approximately 10 μm thick and sensitized with ammonium dichromate. A highly transparent polyester film approximately 100 μm thick serves as backing film for the gelatine layer.

The hologram is partially extinguished in the gelatine layer in the edge region of the holographic element in accordance with the desired web. Since gelatine-based holograms are sensitive to moisture, such holograms can be erased by moisture, and only the transparent gelatine layer remains at these locations.

The local application of moisture is expediently performed with the aid of silk-screen printing. In this process, a water-containing paste suitable for printing is printed onto the dichromate gelatine layer containing the hologram by means of a silk-screen stencil having the web-like design. Immediately after the moisture has diffused into the gelatine layer, that is to say after only a few seconds, the hologram is destroyed in the regions covered by the printing paste. In order to avoid further diffusing of the moisture into the gelatine layer, immediately thereafter the holographic element is heated to a temperature of approximately 60 degrees Celsius, and kept at said temperature for approximately 2 hours. The holographic element can then be integrated into the windscreen in a known manner.

EXAMPLE 2

A holographic element having a reflection hologram and a web-like transition region at the edge is generated as the hologram is produced.

Figure 3:
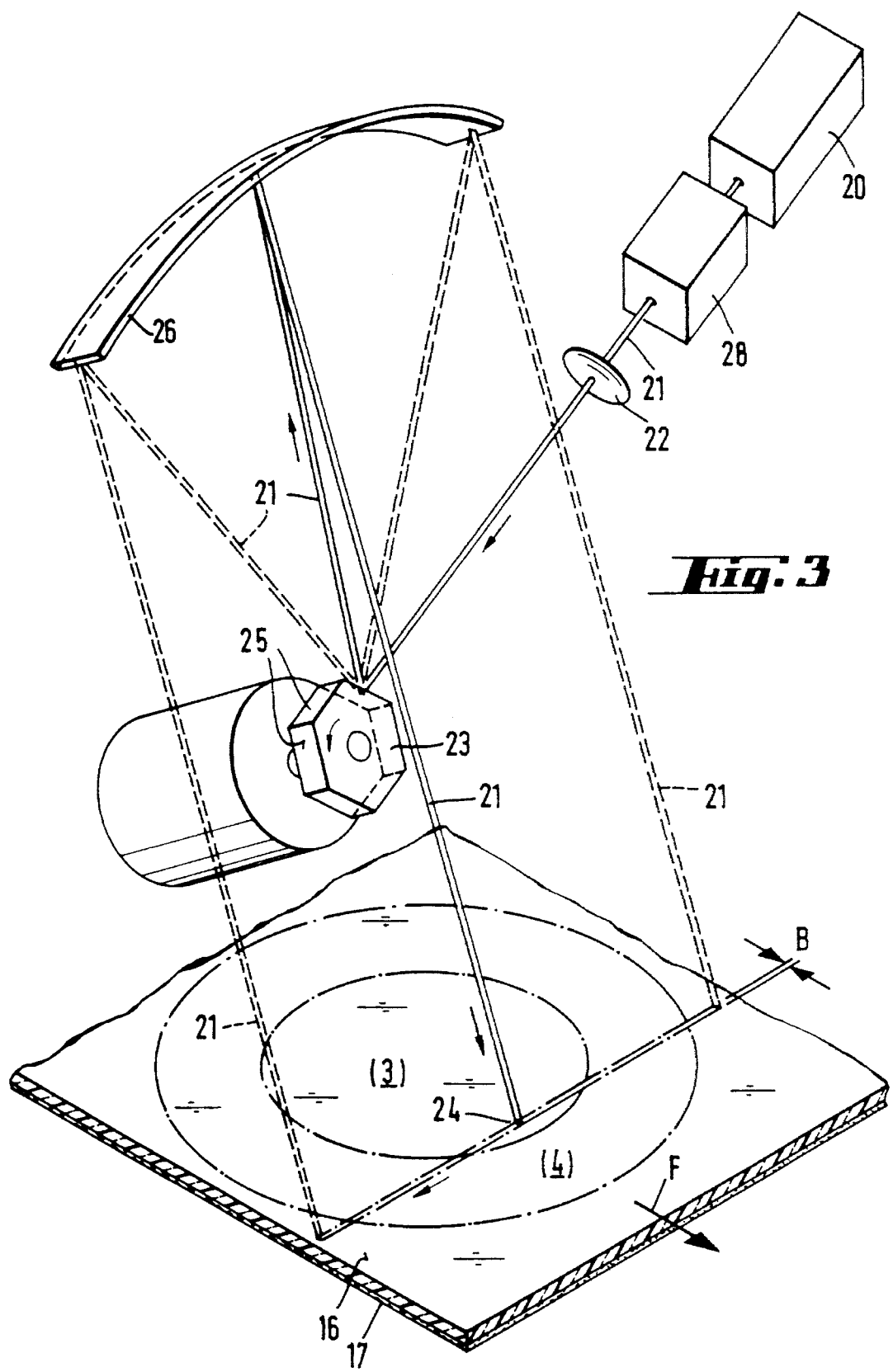
FIG. 3 is a perspective view of an apparatus suitable for producing a holographic element according to the invention.

Use is made for this purpose of a method for producing the hologram which is described in U.S. Pat. No. 5,145,756. The basic structure of an arrangement for carrying out this method is represented in FIG. 3.

In this method, the light-sensitive layer 17 arranged on the backing film 16 is exposed through the backing film 16 in strips to a laser radiation beam 21 guided over the backing film, while the backing film 16 is moved further in the direction of the arrow F transverse to the light track. After passing through a focusing optical system 22, the laser radiation beam 21 generated by the laser 20 impinges on the reflecting surfaces of a rotating polygonal mirror 23. The size of the light spot 24, and thus the width B of the light track in the light-sensitive layer 17 is established with the aid of the focusing optical system 22. The axis of rotation of the polygonal mirror 23 is arranged such that the reflecting surface 25 respectively reflecting the laser beam 21 is located in the focal plane the concave mirror 26. By rotating the polygonal mirror 32, the laser radiation beam 21 is periodically reflected onto the concave mirror 26 and from the latter onto the backing film 16 supporting the light-sensitive layer 17. In this way, the laser radiation beam 21 is deflected over the width of the light-sensitive layer 17 with a specific frequency, which is tuned to the rate of movement of the backing film 16 in the direction of arrow F.

An electro-optical modulator 28 is interposed in the beam path of the laser radiation beam 12. The electro-optical modulator 28 is computer controlled and respectively interrupts the laser beam in the transition regions at the edge of each holographic element according to a prescribed program which corresponds to the desired web design. Computer-controlled punctiform exposure is thus performed in this way in the transition regions of the holographic element, so that the desired web-like construction of the hologram is performed from the start in the transition regions. In this arrangement, the holographic elemental areas in the web-like structure have the same optical characteristics as the central region of the holographic element.

The hologram thus produced is arranged in the known manner inside the windshield, that is to say between the two silicates glass panes of a laminated glass pane.

EXAMPLE 3

Once again, a holographic element having a reflection hologram and a transition zone at the edge is generated as the hologram is produced with the aid of the apparatus represented in FIG. 3.

The electro-optical modulator 28 interposed in the beam path of the laser radiation beam 21 is once again computer controlled. However, when the transition region at the edge of each holographic element is exposed, the laser beam is not interrupted in this case for the purpose of web-like structure formation, but the electro-optical modulator 28 varies the intensity of the laser beam in the transition zone continuously, to be precise from a maximum intensity directly next to the central region to a minimum intensity at the outer edge of the transition zone. A transition zone is generated in this way which has a continuous holographic layer with continuously changing reflection characteristics.

The hologram thus produced is arranged in the known manner inside the windshield, that is to say between the two silicate glass panes of a laminated glass pane.

EXAMPLE 4

Once again, a holographic element having a reflection hologram and a transition zone at the edge is produced by the scanning method. In order to expose the central region of the hologram intensely, but to expose the transition region less intensely with decreasing energy, the scanning rate is correspondingly varied in a manner such that it is low in the central region and increases inside the transition region with increasing distance from the central region. In this case, once again, an exposure device is used as represented in FIG. 3, but without the electro-optical modulator 28. Instead of this, the rate of rotation of the motor rotating the polygonal mirror 23 is controlled by computer such that the desired scanning rate is yielded at each point on the backing film 16.

EXAMPLE 5

A holographic element having a reflection hologram and a transition zone is generated as the hologram is produced. The transition zone is to have both a web-like structure and changing optical characteristics in the holographic subareas of this structure.

The production of such a holographic element is served once again by the arrangement represented in FIG. 3, in which a computer-controlled electro-optical modulator 28 is interposed in the beam path of the laser radiation beam 21. The control program for the modulator 28 is designed in this case such that the laser radiation beam 21 is interrupted according to the desired web-like structure in the transition zone, on the one hand, and the light intensity in the transition zone is varied simultaneously, on the other hand. In this way, the holographic elemental areas in the transition region have a reflectivity which decreases towards the edge and/or a color in the reflection and in the transition which changes towards the edge.

The hologram thus produced is integrated in a known way into a laminated glass pane.

EXAMPLE 6

Once again, a holographic element having a reflection hologram and a web-like transition region at the edge is generated as the hologram is produced.

Figure 4:
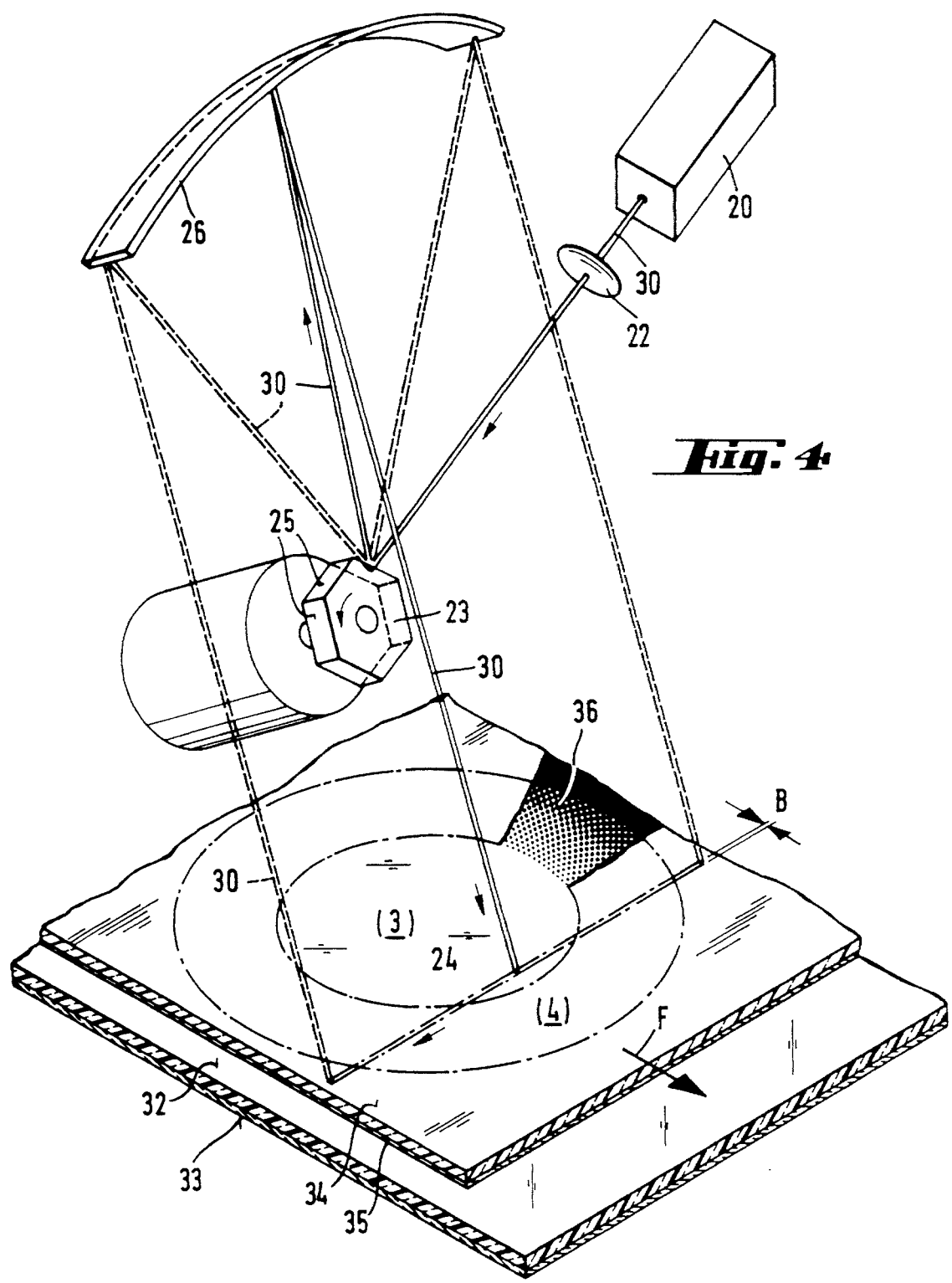
FIG. 4 is a view similar to FIG. 3 of another embodiment suitable for producing a holographic element according to the invention.

Once again, the hologram is produced using a scanning method, to be precise with the aid of the arrangement represented in FIG. 4. By contrast with the method described in the preceding examples, however, no electro-optical modulator is arranged in the beam path of the laser radiation beam 21, but rather the laser radiation beam 30 is directed in this case with constant intensity without interruption on the polygonal mirror 23 and the concave mirror 26.

In order to generate the desired raster in the light-sensitive layer 33 arranged on the backing film 32, a transparent film 34 which is optically coupled to the backing film 32 via a suitable immersion liquid layer 35, for example xylene, is guided in this case synchronously with the backing film 32. A mask 36 which is made of opaque paint and represents the negative of the desired web-like design, is printed onto this transparent film 34. In this way, the light-sensitive layer 33 is exposed through the foil 34 in the transition region only at the locations, and thus the hologram is developed in the transition region only at the locations, which are not covered by the opaque mask.

EXAMPLE 7

A hologram having a continuously changing reflectivity in the edge region in conjunction with a constant reflection wavelength is produced as follows:

A dichromate gelatine layer is first produced as described in Example 3 or 4, by exposing the transition zone adjoining the central region to laser energy which decreases towards the edge. Subsequently, a second exposure cycle of the dichromate layer is performed using incoherent UV light. The UV exposure takes place through a filter mask which covers the central region of the hologram completely and represents in the transition region a stepped or continuously changing neutral filter whose transmission is low adjacent to the central region and increases towards the edge. The neutral filter produces an exposure energy of the UV light opposing the exposure energy of the laser light in such a way that the sum of the two exposure energies is the same at each location of the hologram.

The two exposure steps, that is to say the exposure to laser light and the exposure to UV light, can also be performed in the reverse sequence. All that is important is that the dichromatic layer is exposed to a uniform total energy on the entire area of the hologram.

The additional exposure to incoherent UV light produces crosslinkage of the gelatine molecules, so that the gelatine layer is hardened uniformly in the transition region in the same way as in the central region. This avoids the formation of less intensely hardened gelatine regions, which swell more than intensely hardened gelatine regions. To be precise, a different swelling capacity of the hologram leads to a color shift. The color shift is avoided by the compensating second exposure using UV light, so that a hologram produced in such a way has a constant color sensation despite different transmissivity and reflectivity in the transition zone.

We claim:

1. Method for producing a holographic element integrated in a glass pane with area dimensions smaller than the glass pane and a transition zone of a moisture-sensitive dichromated gelatin layer in its region bordering the visual range of the glass pane, the improvement comprising the steps of:

a) developing in the moisture-sensitive dichromated gelatin layer a homogeneous reflection hologram reaching up to the edge of the holographic element; and b) varying the characteristics of the reflection hologram in the transition zone by local surface erasure in accordance with a web pattern, said surface erasure being carried out by printing a water-containing printing paste onto the dichromated gelatin layer containing the hologram in the desired web pattern to produce said local surface erasure and said web pattern.

2. The method of claim 1 wherein said surface erasure printing procedure employs silk-screen printing to produce said local surface erasure and said web pattern.

3. Method for producing a holographic element integrated in a motor vehicle windshield with area dimensions smaller than the glass pane and a transition zone of a moisture-sensitive dichromated gelatin layer in its region bordering the visual range of the glass pane, the improvement consisting essentially of:

a) developing in the moisture-sensitive dichromated gelatin layer a homogeneous reflection hologram reaching up to the edge of the holographic element; and b) varying the characteristics of the reflection hologram in the transistion zone by local surface erasure in accordance with a web pattern;

wherein the surface erasure is facilitated by applying an erasure agent of a water-containing paste onto the dichromated gelatin layer containing the hologram in the desired pattern.

\* \* \* \* \*